April 13, 1943.  E. A. LATTA  2,316,697
INTERNAL COMBUSTION ENGINE
Filed June 11, 1942  2 Sheets-Sheet 1
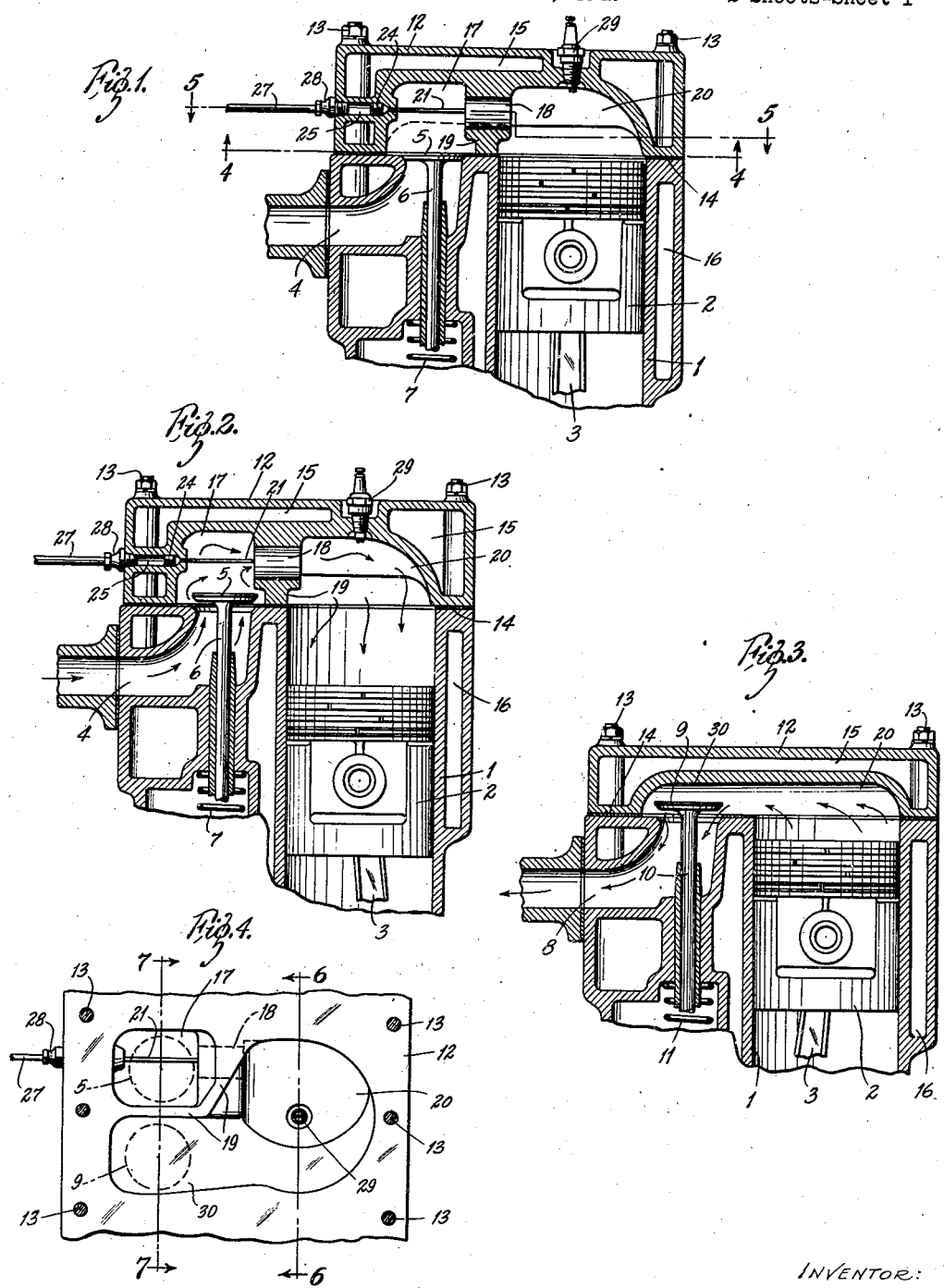
INVENTOR:
EVERETT A. LATTA,
BY John D. Rippey
HIS ATTORNEY.

April 13, 1943.  E. A. LATTA  2,316,697
INTERNAL COMBUSTION ENGINE
Filed June 11, 1942  2 Sheets-Sheet 2

INVENTOR:
EVERETT A. LATTA,
BY John D. Rippey
HIS ATTORNEY.

Patented Apr. 13, 1943

2,316,697

UNITED STATES PATENT OFFICE 2,316,697

INTERNAL COMBUSTION ENGINE

Everett A. Latta, Clayton, Mo.

Application June 11, 1942, Serial No. 446,572

3 Claims. (Cl. 123—32)

This invention relates to internal combustion engines; and has special reference to devices for conducting liquid fuel to the combustion chambers and atomizing the liquid fuel and thoroughly mixing the atomized fuel with incoming air, preparatory for combustion in the combustion chambers.

Objects of the invention are to provide an internal combustion engine having cylinders for reciprocating pistons, with a cylinder head attached to and cooperating with the cylinders to form combustion chambers and having intake and exhaust ports communicating with the respective cylinders only for the admission of air and atomized liquid fuel into said chambers and for the exhaust of the burnt gases from said chambers; to provide walls in the cylinder head between the respective ports separating each combustion chamber; and to provide tubes detachably connected with the cylinder head for conducting liquid fuel under pressure from a source of supply such as a pump and injecting said liquid fuel into atomizers and then into the combustion chambers of the engine for combustion, thereby dispensing with the use of carburetors and the like.

Another object of the invention is to provide improved means for atomizing liquid fuel and injecting the atomized fuel into the combustion chambers of an internal combustion engine during intake stroke, and to provide separate exhaust ports wholly out of communication with said atomizing and injecting means for exhausting the burnt gases from the cylinders.

Another object of the invention is to provide improved means for atomizing liquid fuel and injecting the atomized fuel into the combustion chambers during the intake strokes, and for thoroughly mixing the atomized fuel with the incoming air, thereby permitting the use of liquid fuels heavier than gasoline.

Various other objects and advantages of the invention will be apparent from the following description, reference being made to the annexed drawings, in which—

Fig. 1 is a vertical cross-sectional view of a portion of an internal combustion engine embodying the present invention, and showing particularly the liquid fuel supply, the air intake, and the liquid fuel atomizer opening into the combustion chamber, the air intake valve being closed, and the piston being at the end of its up-stroke.

Fig. 2 is a similar sectional view showing the air intake valve open and the piston about the middle of the down-stroke, the arrows above and below the intake valve indicating the flow of fresh air, and the arrows in the combustion chamber and cylinder showing the cyclonic flow of atomized liquid fuel and air.

Fig. 3 is a cross-sectional view showing the exhaust valve open and the piston moving toward and near the end of its up-stroke, the arrows indicating the flow of the burnt gases from the cylinder.

Fig. 4 is a sectional view on the line 4—4 of Fig. 1, showing an inverted plan view of a portion of the cylinder head having the non-communicating intake and exhaust ports opening, respectively, into and from one combustion chamber of the cylinder.

Figure 5:
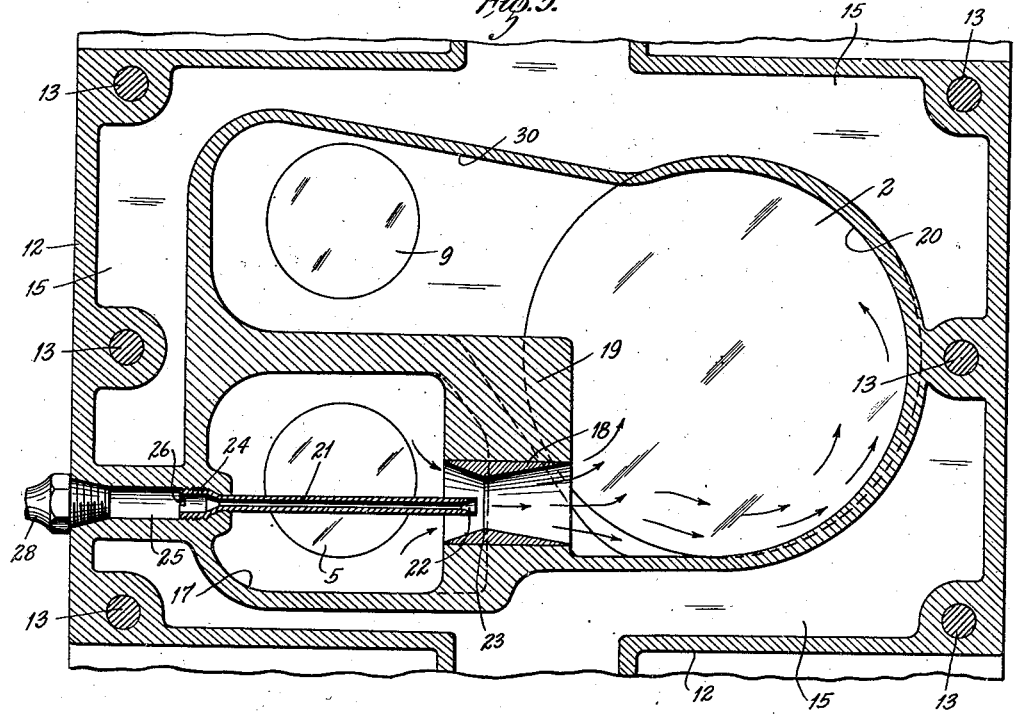
Fig. 5 is an enlarged sectional view on the line 5—5 of Fig. 1.
Figure 6:
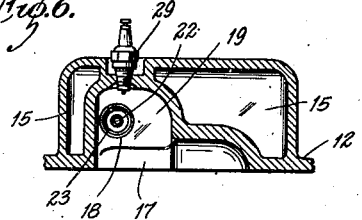
Fig. 6 is a sectional view of the cylinder head on the line 6—6 of Fig. 4.
Figure 7:
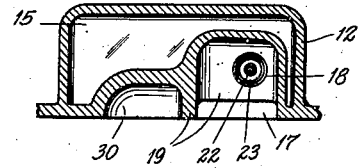
Fig. 7 is a sectional view of the cylinder head on the line 7—7 of Fig. 4.

The body of the engine for which the present invention is provided is a casting containing any desired number of cylinders 1 each of which encloses a working piston 2. The pistons 2 reciprocate in the cylinders 1 on up and down strokes, one of said pistons being shown at the end of its up-stroke in Figs. 1 and 3 and in an intermediate position of its down-stroke in Fig. 2. The respective pistons are connected with the driven crank shaft of the engine by pitman rods 3, as is well known. The body 1 of the engine is formed with an air intake port 4 to each cylinder, and said ports are controlled by valves 5 movable from closed position (Fig. 1) to open position (Fig. 2) and vice versa. The valve stems 6 are operated to open the valves 5 by a cam shaft (not shown), and to close said valves by springs 7, in the usual manner. The engine body 1 is also formed with exhaust ports 8 for exhausting from the respective cylinders and their combustion chambers the burnt gases resulting from combustion of atomized fuel in the combustion chambers. Each exhaust port 8 is controlled by a valve 9 movable from closed position in which they prevent outlet of atomized fuel from the respective combustion chambers to open position in which they permit discharge or exhaust of the burnt gases from the combustion chambers (Fig. 3). The valve stems 10 are operated to open the valves 9 by a cam shaft (not shown) and to close said valves by springs 11, in the usual manner.

The cylinder head 12 is a unitary or one-piece casting or forging extending the full length of the cylinder body. It covers all of the cylinders 1 and also covers all intake valves 5 and all exhaust valves 9. The cylinder head is detachably secured to the engine body by bolt and nut fasteners 13, a leak-proof joint being obtained by a gasket 14 between the cylinder head and the body of the engine. The cylinder head is formed with a water jacket 15 communicating with the usual water jacket 16 of the engine proper to afford circulation of water through the cylinder head to prevent overheating.

The present invention is embodied in or in connection with the cylinder head and comprises a space or valve chamber 17 opening directly into the inlet port 4 and of sufficient area to permit free movement of the valve 5 during opening and closing movements of said valve. A Venturi tube 18 is rigidly mounted in an opening in the wall 19 separating the space or chamber 17 from the adjacent combustion chamber 20. There is one space or chamber 17 for each valve 5, and said spaces or chambers have communication with the respective combustion chambers 20 only through the Venturi tubes 18. An injector nozzle 21 has its flared discharge end 22 within and coaxial with the Venturi tube 18. The effluent end of the nozzle 21 is a short distance beyond the influent side of the restriction 23 of the Venturi tube (Fig. 4). The nozzle 21 is provided with an enlarged externally threaded formation 24 screwed into a threaded hole 25 in the cylinder head 12. The head formation 24 is provided with slots 26 for engagement by a screw-driver to attach and detach the nozzle 21 rigidly in a position in which it is in axial alinement with or in axial continuation of the Venturi tube 18.

A liquid fuel conduit or supply tube 27 is in permanent communication with each cylinder 1 through the hole 25, nozzle 21 and Venturi tube 18. The tubes 27 are detachably held in connection with the cylinder head 12 by nipples 28 swiveled on the ends of said tubes 27 and screwed into the outer ends of the holes 25. The nipples 28 may be detached for any needed purpose. The tubes 27 conduct liquid fuel under pressure for discharge through the nozzles 21 for atomization in the Venturi tube 18. The atomized liquid fuel will be drawn into the combustion chambers 20 automatically and as an incident by downward movement of the pistons 2 along with fresh air admitted through the intake ports 4 to carry and sustain the atomized liquid fuel.

It will be understood that liquid fuel is discharged from the respective tubes 27 intermittently and only while the inlet valves 5 are open (Fig. 2) and while the exhaust valves 9 are closed; which is to say, during the down-strokes, or what is commonly called the intake stroke, of the pistons 2. During up-strokes of the respective pistons 2 when atomized liquid fuel is contained in the combustion chambers 20, both valves 5 and 9 are closed in order to obtain compression. When the pistons 2 reach the ends of their up or compression strokes, the spark plugs 29 are energized under control of the timer (not shown), as usual, to effect explosive combustion of the compressed atomized liquid fuel, and thereby impel the pistons 2 downwardly.

On the next up-stroke of each piston 2, the burnt gases are exhausted from the cylinder 1 through the exhaust port 8, the exhaust valve 9 being opened by the cam shaft in the usual manner to permit such exhaust of the burnt gases. During exhaust of the burnt gases from the respective cylinders, the intake valves 5 are closed. Also, during exhaust of the burnt gases from the respective cylinders, no liquid fuel is discharged into the cylinders from which burnt gases are being exhausted, discharge of the liquid fuel under pressure through the tubes 27 being automatically controlled by the pressure pump (not shown). The wall 19 extends continuously between and separates each valve space or compartment 17 from the corresponding exhaust passage 30 formed in the cylinder head 12 from the combustion chamber 20 to the exhaust port 8. Said wall 19, in cooperation with the gasket 14 and a wall separating the intake port 4 from the exhaust port 8, effectively prevents or closes communication between the space or compartment 17 and the exhaust passage 30.

This invention satisfactorily atomizes liquid fuel in fresh air and thoroughly mixes the atomized fuel and air. The atomized liquid fuel is discharged under pressure into the combustion chambers 20 at the same time that fresh air is drawn into said combustion chambers through the intake ports 4 and the Venturi atomizing tubes 18. The intake of atomized fuel alternates with the exhaust of the burnt gases from the cylinders 1 and the combustion chambers 20. For the purpose of effecting alternate intake of atomized fuel and exhaust of the burnt gases, it should be understood that the valves 5 and 9 are never open at the same time but that the opening and closing of said respective valves alternate, the valve 5 being opened during the time that the valve 9 is closed, and vice versa.

Figure 8:
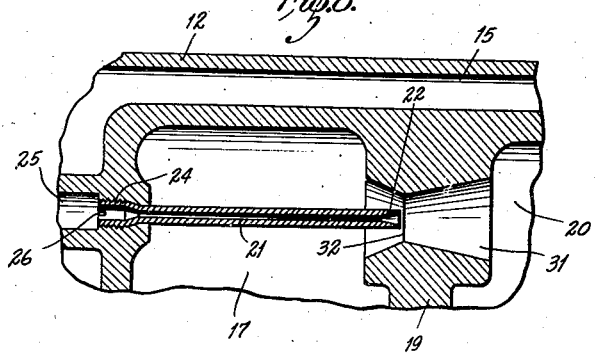
Fig. 8 is an enlarged sectional view showing a modification of one feature of the invention.

The modification shown in Fig. 8 has the Venturi tube atomizer feature formed directly in the wall 19 instead of having a separate Venturi tube such as the tube 18 rigidly mounted in said wall 19. The Venturi tube 31 with its restriction 32 may be formed directly through the wall 19 with the injector nozzle 21 having its flared discharge end 22 within and coaxial with said tube 31. The effluent end of the nozzle 21 is wholly within the flaring influent end of the Venturi tube and is spaced a short distance from the restriction 32. In this modification, as in the arrangement first described, the fresh air and the injected liquid fuel contact each other before they reach the restriction of the Venturi tube. In both instances, the Venturi tube is preferably located toward one side of the combustion chamber 20 so as to effect a cyclonic movement of the atomized liquid fuel and air suggested by the arrows in Fig. 5 and thus contribute to even distribution of the atomized liquid fuel in the combustion chamber and in the cylinder and promote combustion by action of the spark plug. In either form of the invention, the atomizer device is of much less cross-sectional area than the cross-sectional area of the exhaust passage 30.

From the foregoing, it should be apparent that this invention effectively attains all of its intended objects and purposes efficiently and satisfactorily. It dispenses with the use of equipment such as carburetors for delivering carbureted gas into the cylinders, and thereby dispenses with the necessity of maintaining such equipment. The atomizer nozzle 21 may be removable and replaceable as shown, so that the fuel atomizing equipment may be kept in uniformly good condition. The specific construction and arrangement of parts shown and described may be varied within the scope of equivalent limits without departure from the nature and principle of the invention.

I claim:

1. In an internal combustion engine having a body provided with a cylinder, an air intake port, an exhaust port, and valves for opening and closing said ports alternately and intermittently; a cylinder head detachably secured to said body and having non-communicating passages opening respectively into said intake and exhaust ports and receiving said valves when said valves are opened and also having a combustion chamber opening into said cylinder and communicating with said said passage to said exhaust port, a Venturi tube opening from said passage to said intake port into said combustion chamber and having a restriction intermediate of its ends, an atomizer nozzle extending coaxially into the influent end of said Venturi tube and terminating at the influent side of said restriction of said tube, and a tube for conducting liquid fuel under pressure to said nozzle.

2. In an internal combustion engine having a body provided with a cylinder, an air intake port, an exhaust port, and valves for opening and closing said ports alternately and intermittently; a cylinder head detachably secured to said body and having a combustion chamber at the upper end of said cylinder and also having non-communicating passages opening respectively into said intake and exhaust ports and receiving said valves when said valves are opened, a Venturi tube opening from said passage to said intake port into said combustion chamber and having a restriction intermediate of its ends, an atomizer nozzle removably mounted in said cylinder head and extending coaxially into the influent end of said Venturi tube and having a flaring outlet at the influent side of said restriction of said tube, a tube for conducting liquid fuel under pressure toward said nozzle for discharge therefrom into said Venturi tube and thence in atomized form into said combustion chamber, and a device detachably securing said tube to said cylinder head in communication with said nozzle.

3. In an internal combustion engine having a body provided with a cylinder, an air intake port, an exhaust port, and valves for opening and closing said ports alternately and intermittently; a cylinder head detachably secured to said body and having a combustion chamber above said cylinder and also having a chamber communicating with said intake port and a passage forming communication from said combustion chamber and cylinder to said exhaust port, a wall integral with said head separating said first named chamber from said combustion chamber and also hermetically separating said first named chamber from said passage, a Venturi tube opening from said first named chamber into said combustion chamber and having a restriction intermediate of its ends, an atomizer nozzle extending coaxially into the influent end of said Venturi tube and terminating at the influent side of said restriction of said tube, and a tube for conducting liquid fuel under pressure toward said nozzle and intermittently discharging said fuel through said nozzle into said Venturi tube for atomization and discharge into said combustion chamber.

EVERETT A. LATTA.